UNITED STATES PATENT OFFICE.

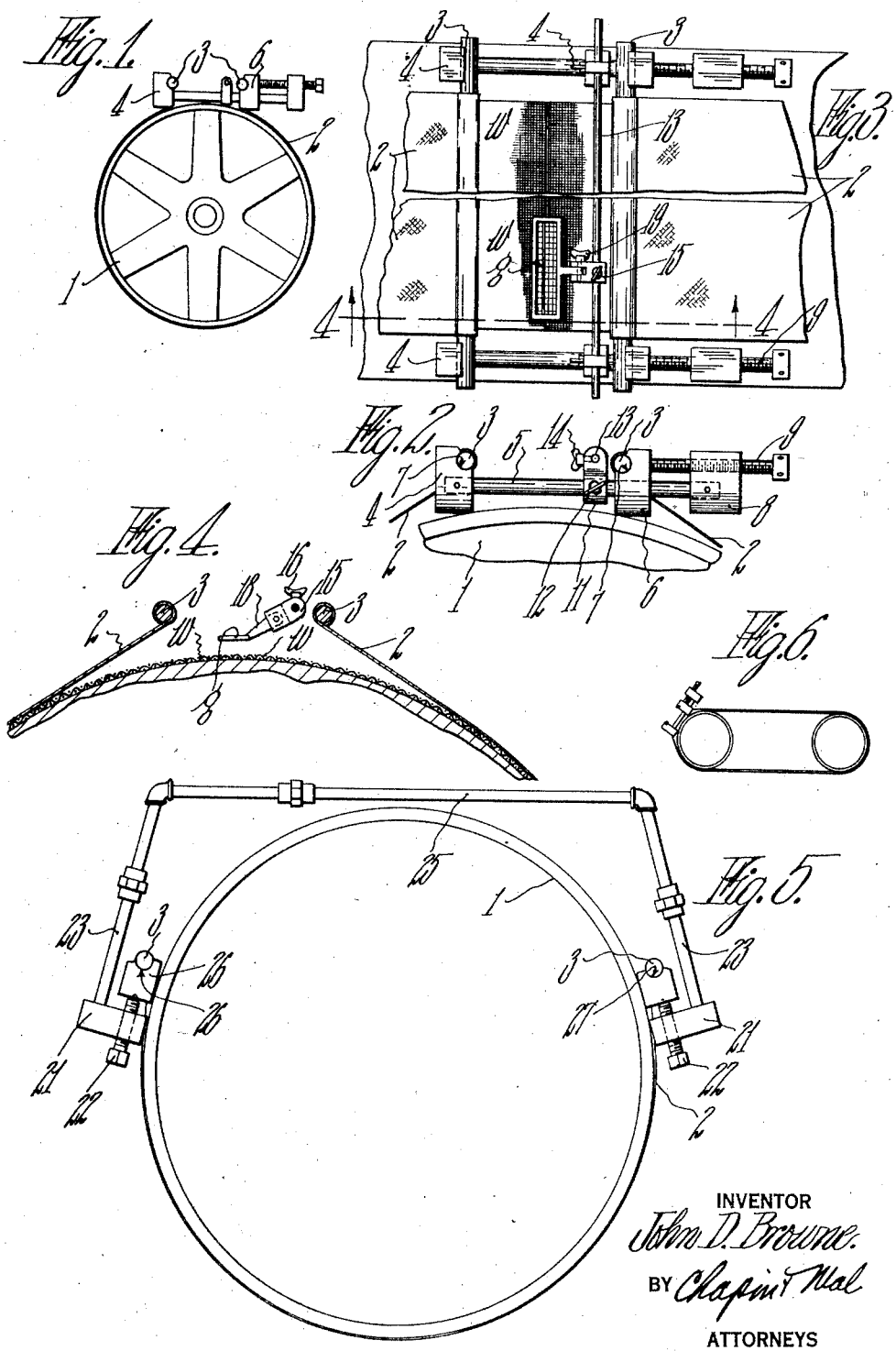

JOHN D. BROWNE, OF SPRINGFIELD, MASSACHUSETTS.

BAND-JOINING DEVICE.

1,415,918.     Specification of Letters Patent.    Patented May 16, 1922.

Application filed March 25, 1921. Serial No. 455,612.

*To all whom it may concern:*

Be it known that I, JOHN D. BROWNE, citizen of the United States, residing at Springfield, in the county of Hampden and State of Massachusetts, have invented new and useful Improvements in Band-Joining Devices, of which the following is a specification.

This invention relates to improvements in apparatus for use in joining belts and particularly for use in drawing together the ends of a belt, while in place on one or more rolls, to permit convenient joining of the ends into an endless belt.

While the invention may be used generally in connection with the joining of belts of various materials, it finds one advantageous use in connection with the joining of a Fourdrinier wire. In joining the ends of a Fourdrinier wire, considerable care must be exercised to insure that the wire lies evenly against the roll or rolls before joining and that it be uniformly tensioned throughout its width without unduly stretching the wire.

This invention has for an object the provision of an apparatus for drawing together the ends of an endless band while in place over one or more rolls, characterized by means for partially encompassing the band and pressing it evenly about its roll or rolls while its ends are being drawn together.

The invention in an embodiment at present preferred is shown for illustrative purposes in the accompanying drawings, in which.—

Fig. 1 is a side elevational view showing one use of my improved apparatus;

Fig. 2 is an enlarged fragmentary side elevational view thereof;

Fig. 3 is a plan view thereof;

Fig. 4 is a sectional view on the line 4—4 of Fig. 3;

Fig. 5 is a side elevational view showing a modification; and

Fig. 6 is a small scale diagrammatic view showing another use of the apparatus.

The apparatus includes an apron 2, which is preferably made of flexible cloth fabric or the like, adapted to encircle the roll, as shown in Fig. 1, or to encompass several rolls over which the wire cloth, or other band or belt, is laid. Transverse bars or rods 3 are secured to both ends of the apron 2 by any suitable means and are adapted, when moved toward one another, to exert a tension upon, or pull taut, the apron 2, whereby the wire cloth beneath it is pressed firmly and evenly against the roll or rolls 1.

The bars 3 may be moved toward one another by the following mechanism, which comprises a pair of jack mechanisms. Each of the latter includes relatively movable head members 4 and 6 mounted on a shank 5, one, as 4, being fixed and the other, as 6, being slidable thereon. Semicircular recesses or seats 7 are provided in the adjacent sides of the members 4 and 6, and are adapted to receive therein the ends of the bars 3. A block 8 is fixed to one end of each shank 5 and carries in threaded engagement therewith a bolt 9 which is so disposed that its end will abut the member 6 and move it along the shank 5.

A magnifying glass $g$ is provided and is adapted to be adjusted to lie in various positions over the adjacent edges of the wire cloth being joined. Brackets 11, slidably mounted upon the shanks 5, are provided with set-screws 12 by means of which the brackets 11 may be adjustably positioned on the shanks 5. A shaft 13 disposed transversely to the shanks 5 fits loosely in suitable bearings in the brackets 11, and set-screws 14, in threaded engagement with the brackets, are provided to clamp the rod 13 in various adjusted positions. A bifurcated arm 15 is slidably mounted upon the shaft 13 and is provided with a set-screw 16 for clamping the said arm in various positions along the shaft. The magnifying glass $g$ is provided with a lug 18 that is adapted to interfit the bifurcated end of the arm 15 and slot in the bifurcated end of the arm 15 and is adjustably and pivotally connected thereto by means of a clamping screw 19.

In operation, to facilitate the joining of the ends of a fabric such as a Fourdrinier wire, the material, or wire cloth $w$, is laid around the roll or rolls 1 in the usual manner, and the apron 2 is wrapped over and around the wire in such a manner as to partially encompass it. The ends of the rods 3 are engaged in the recesses 7 of the head 4 and the slidable member 6, and, by means of the threaded bolts 8, the members 9 are moved along their respective shanks and carry the rods 3 toward one another. As the rods are moved toward one another, the apron 2 is pulled taut and presses the wire cloth evenly and firmly against the roll or rolls and as the wire cloth is thus pressed firmly against the drum, the edges to be joined are moved toward one another for the joining operation. The magnifying glass $g$ may be moved to a position over and along the edges of the wire cloth and secured in any desired location, by means of which the weft and warp members of the wire cloth, as well as their relative location, are greatly enlarged, whereby the stitching and joining of the edges is easily accomplished.

A modified form of the invention is shown in Fig. 5 and is particularly applicable when it is desired to encompass less of the wire cloth than by the form shown in Figs. 1, 2, 3, and 4.

Blocks 21 are provided and have in threaded engagement therewith tightening screws 22. Standards 23, preferably of pipe or the like, are fixed to the blocks 21, and are connected by suitable fittings to the cross-support 25. These standards 23, by being connected to the cross-support, serve to hold the said blocks in a fixed relation. Members 26, having suitable recesses 27 for supporting the ends of the rods 3, are adapted to rest upon the roll 1 and be moved toward one another by action of the screws 22.

In the use of the apparatus shown in Fig. 5, the wire cloth is as usual placed around the roll 1 and the apron 2 is as before laid upon the wire cloth to partially encompass it. The rods 3 of the apron are supported in the recesses of the blocks 26 and the screws turned to move the blocks 26 toward one another. The apron 2 is pulled taut by the forward movement of the blocks 26 and presses that portion of the fabric encompassed by it evenly and firmly against the drum and allows the free ends of the wire cloth to be joined in the usual manner.

What I claim is—

Apparatus for facilitating the joining of the ends of Fourdrinier wire comprising, an apron to partially encompass the wire when mounted on its roll, rods fixed to each end of the apron, mechanism located at each side of the apron for moving the rods toward one another for tightening the apron each of which comprises, a shank having a head fixed to one end thereof that is provided with a recess for receiving an end of one of said apron rods, a block fixed to the opposite end of said shank, a member slidable upon the said shank between the said head and block for supporting one end of the other of said apron rods and a screw threaded in the block and adapted to abut the slidable member for the tightening operation.

In testimony whereof I have affixed my signature.

JOHN D. BROWNE.